(12) United States Patent
Yu

(10) Patent No.: US 6,304,007 B1
(45) Date of Patent: *Oct. 16, 2001

(54) SWITCHER FOR SWITCHING CAPACITORS

(75) Inventor: Ho-yuan Yu, Saratoga, CA (US)

(73) Assignee: Lovoltech, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,165

(22) Filed: Dec. 2, 1999

Related U.S. Application Data

(60) Provisional application No. 60/111,625, filed on Dec. 9, 1998.

(51) Int. Cl.$^7$ .................................................. H02M 3/18
(52) U.S. Cl. ................................................................. 307/110
(58) Field of Search ............................. 361/247; 701/45; 180/446, 123

(56) References Cited

U.S. PATENT DOCUMENTS 5,973,944 * 10/1999 Nork ..................................... 307/110
6,198,645 * 5/1999 Kotokowski et al. ................ 307/110
6,211,579 * 9/1999 Blair ....................................... 307/24

* cited by examiner

*Primary Examiner*—Peter S. Wong
*Assistant Examiner*—Pia Tibbits
(74) *Attorney, Agent, or Firm*—Wagner Murabito & Hao LLP

(57) ABSTRACT

This invention discloses a switching device that switches an array of capacitors in series configuration in charging condition and switches an array of capacitors in parallel configuration in discharging condition for voltage stepdown DC to DC converter. This switcher can also be used for the voltage stepup conversion by charging an array of capacitors in the parallel configuration and discharging an array of capacitors in series configuration. The novel structure of this invention is to use the normally "offs" JFETs with both N-chamel and P-channel that provide low on resistance of sub-milliohm and large current for high efficiency energy conversions.

This invention discloses the integrated structure of the switcher. The switcher built in common CMOS IC process is also disclosed in this invention.

25 Claims, 6 Drawing Sheets

SWITCHER FOR SWITCHING CAPACITORS

This Application claims a Priority Date of Dec. 9, 1998, benefited from a previously filed Provisional Application No. 60/111,625 filed on Dec. 9, 1998 by the same Inventor of this Patent Application.

BACKGROUND OF THE INVENTION

1. Field of the Invention

This invention is related to semiconductor switcher structures for switching an array of capacitors used in step-down or step-up DC to DC power converters. This is a four-terminal switcher with a control gate for providing switching function to connect or disconnect an array of capacitors to form series or parallel configurations.

2. Description of the Prior Art

Switching capacitor is one of the original concepts for the energy conversion. It is available in very limited application such as the energy source for high voltage discharge by connecting an array of capacitors in parallel configuration for charging and in series configuration for discharging. Mechanical switchers in manual operations are usually used for this kind of application. However, due to unavailable very low on resistance and low cost semiconductor switcher, this approach has not been realized for the electronic equipment. Most of the power suppliers and DC to DC converters available today are using transformers, inductors and capacitors for the energy conversion in conjunction with rectifiers, MOS transistors, bipolar transistors and/or integrated circuits. Marek S. Makowski et al published an article, "Performance Limits of Switched-Capacitor DC-DC Converters", P. 249, Power Electronics Technology and Applications, Edited by Dr. Fred C. Lee, IEEE TK7881.15, 1997. In this article, theoretical performance limits of switching capacitor DC-DC converter are calculated. It is clearly indicated in this article that the overall efficiency of the converter is a function of the contact resistance of the switcher. A contact resistance of 2 ohms was used in the calculation; therefore, the low efficiency of this kind of converter is resulted. No structure or description of the switcher is discussed in this article. The inventor has submitted several patent ideas to patent office: 1) "Low On Resistance Transistors and the Method of Making", Filed in Patent Office of Disclosed Document Program, Sep. 24, 1998, #444899, provisional application, 60/115,009, was filed on Jan. 6, 1999 and the utility patent application was filed on Oct. 28, 1999. This patent application disclosed low on resistance Junction Field Effect Transistor (JFET) device structures and the fabrication steps for normally "on" JFETs. 2) "Novel Structure of JFETs for Low Voltage Applications", Filed in Patent Office of Disclosed Document Program, Sep. 16, 1998, #444874. This is a normally "off" Junction Field Effect Transistors (JFETs) to provide low on resistance in "on" state. This kind of normally "off" JFET is used in current patent disclosure. The concept of this patent disclosure also filed on Jan. 6, 1999 and Oct. 28, 1999 in combine with 1) to the Patent Office.

SUMMARY OF THE PRESENT INVENTION

This invention discloses a four-terminal switcher with a control gate. This switcher provides the function of connecting an array of capacitors in series configuration during charging and in parallel configuration during discharging for step-down power conversion. In similar principle, this switcher connects an array of capacitors in parallel configuration during charging and in series configuration during discharging, a step-up function is provided. This switcher is using normally "off" Junction Field Effect Transistors (JFETs) or enhancement mode JFETs with N-channel and P-channel structure. Due to special structure of this normally "off" JFETs, very low contact resistance or on resistance of less than 1 milli-ohm can be provided. Furthermore, this switcher offers high switching speed since it is a majority carrier device. A unique integrated structure for this kind of switcher is illustrated and described in this invention. A novel device structure processed along with standard CMOS ICs also disclosed in this invention. Thus the high efficiency of the switching capacitors for DC to DC conversion can be realized.

DETAILED DESCRIPTION OF THE PREFERRED EMBODIMENT

Figure 1:
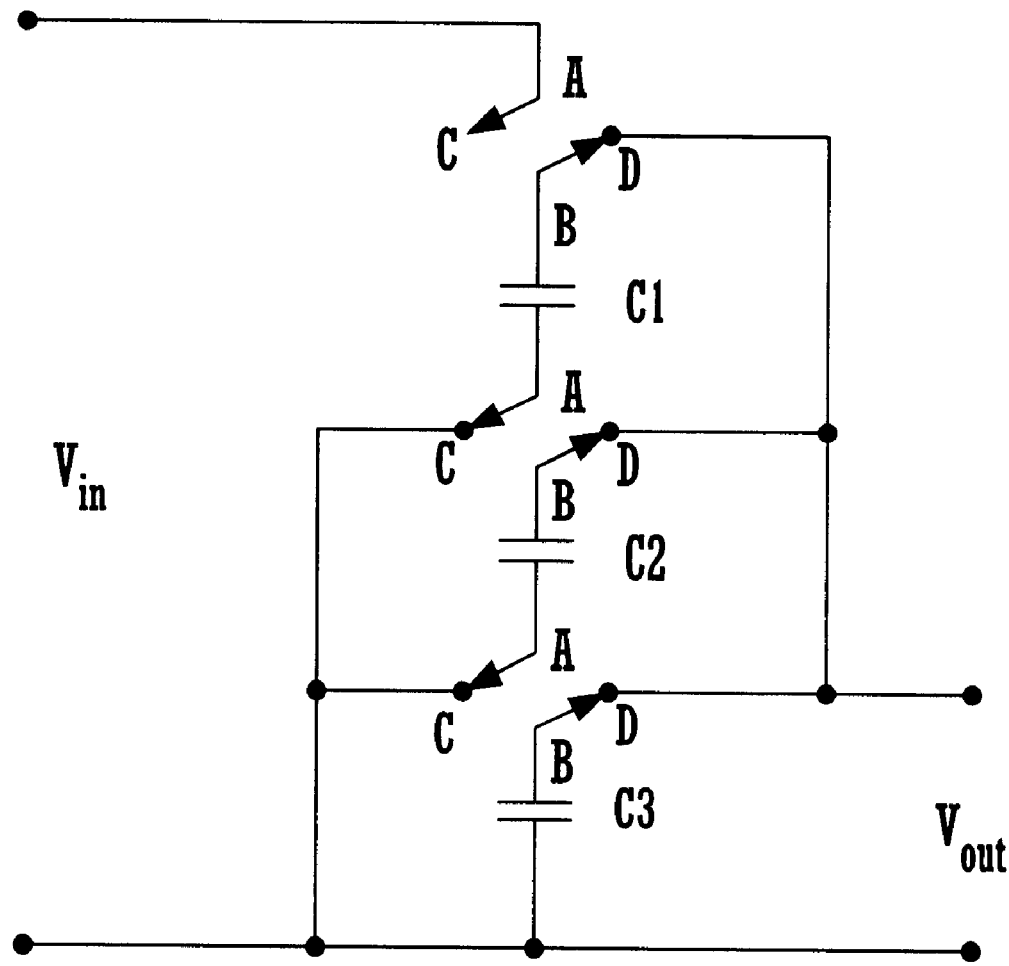
FIG. 1 shows the circuit diagram of the switching capacitors in step-down configuration. During charging state, the terminals A and B are connected; the capacitors are in series configuration for charging. When switcher connects terminals A to C and B to D, the capacitors are in parallel configuration for discharging. Thus the step down function is provided.

FIG. 1 shows the switching capacitors for step-down configuration. An array of capacitor-switcher pairs, two, three, four, five or more are applicable to this application. FIG. 1 demonstrates three capacitor and switcher pairs as an example. Capacitors C1, C2, and C3 with the same capacitance value are assumed. When switcher connects A to B, the capacitors are in series connection. The voltage across each capacitor is about ⅓ of the input voltage. When the switcher connects A to C and B to D, the capacitors C1, C2, and C3 are in parallel connection. The voltage at Vout is the same voltage as C1, C2, and C3. Therefore, the output voltage is about ⅓ of input voltage. However, the current delivered to the output circuitry is about three times of input current since the charge stored in each capacitor will provide three times of current at output terminal than input current.

Figure 2:
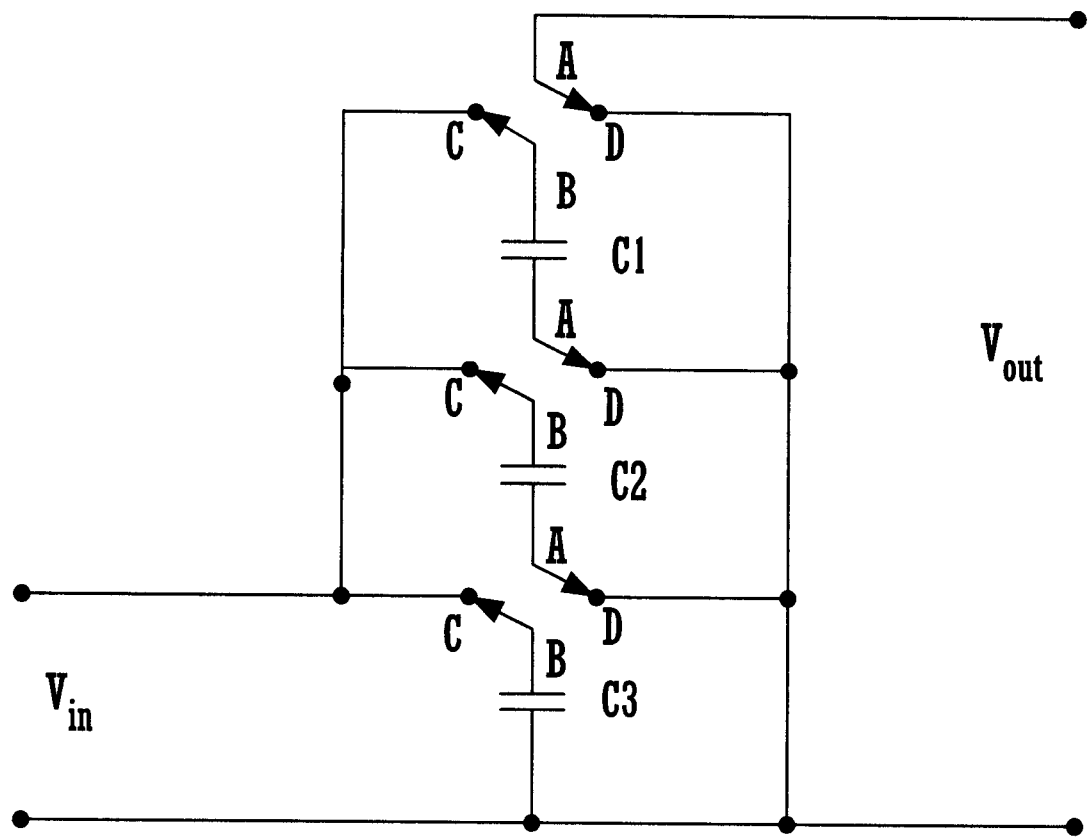
FIG. 2 shows the circuit diagram of the switching capacitors in step-up configuration. An array of capacitors is connected in parallel configuration in charging condition. The switchers connect an array of capacitors in series configuration in discharging condition.

FIG. 2 also shows the step-up configuration in similar way as described in FIG. 1. The only difference is that the capacitors C1, C2, and C2 are connected in parallel configuration during charging and in series configuration during discharging. The output voltage Vout is about three times of the input voltage Vin in this case.

Figure 3:
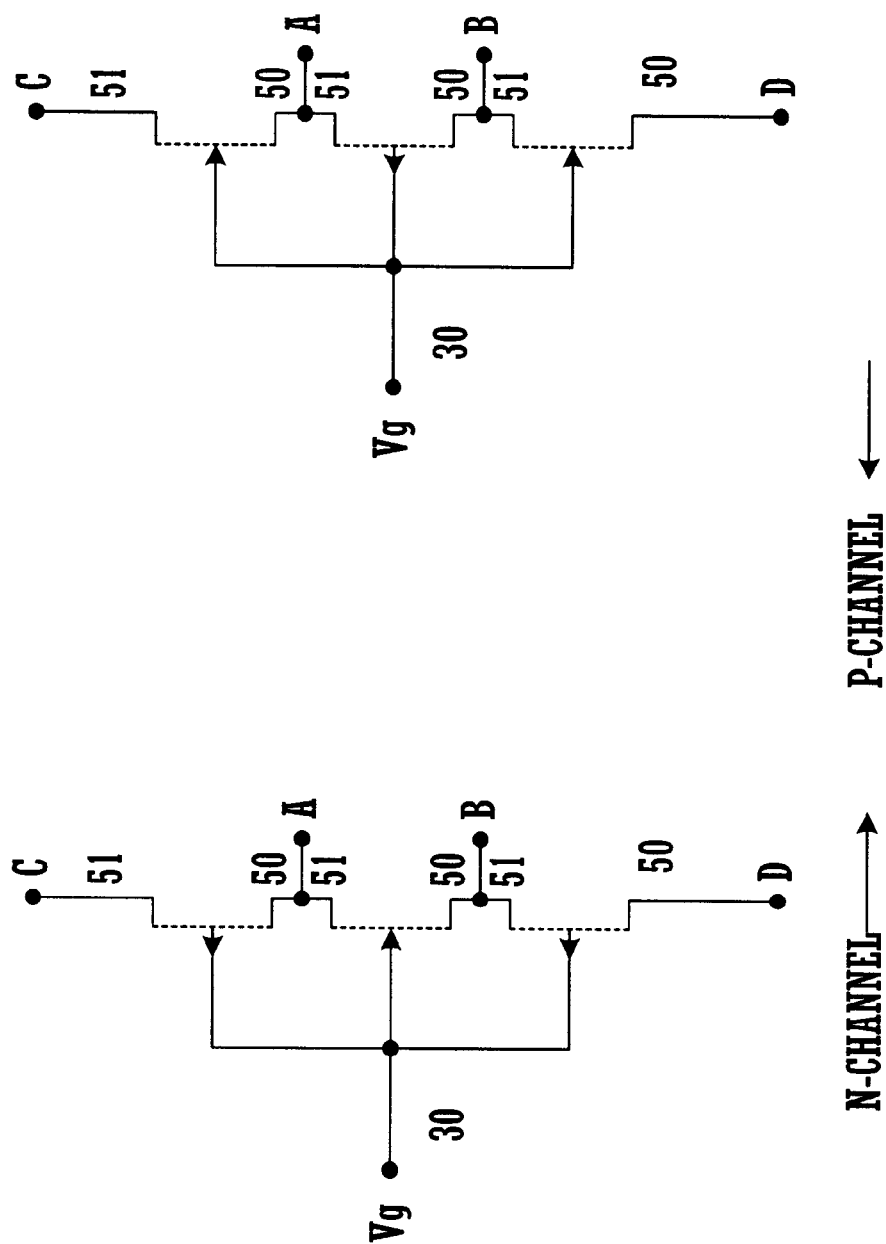
FIG. 3 discloses the diagram of the four-terminal switcher with a control gate utilizing either 2 N-channel and 1 P-channel normally "off" JFETs or 1 N-channel and 2 P-channel normally "off" JFETs to provide the switching function.

FIG. 3 illustrates two kinds of four-terminal switcher. In the first case, two P-channel and one N-channel normally "off" JFETs are connected in series with all gates connected together. The threshold voltage for each normally "" JFETs is around 0.3V and Vg is ranging from −0.5V to +0.5V as an example. The gate turns the JFETs on when the gate is in forward bias above threshold voltage respect to the JFET source and drain. The voltage drop between the source and the drain of each JFET can be as low as 0.1V or much lower. In the first case of switcher 1, when the gate is above +0.3V, the middle JFET 2 turns on and the terminals A and B are connected. The upper JFET 1 and lower JFET 3 are both at "off" state. As the gate voltage is below +0.3V, the middle JFET 2 disconnects the terminals A and B. When the gate voltage is between +0.3 V and −0.3 V, all three JFETs are at "off" state. The array of capacitors is ready to be connected to next configuration. Until the gate voltage is more negative than −0.3V, the upper JFET 1 and lower JFET 3 (they are in forward bias between the gate and source/drain) are turned on. In this condition, terminal A connects to terminal C and terminal B connects to terminal D. Similar principle is applied to switcher 2.

Figure 4:
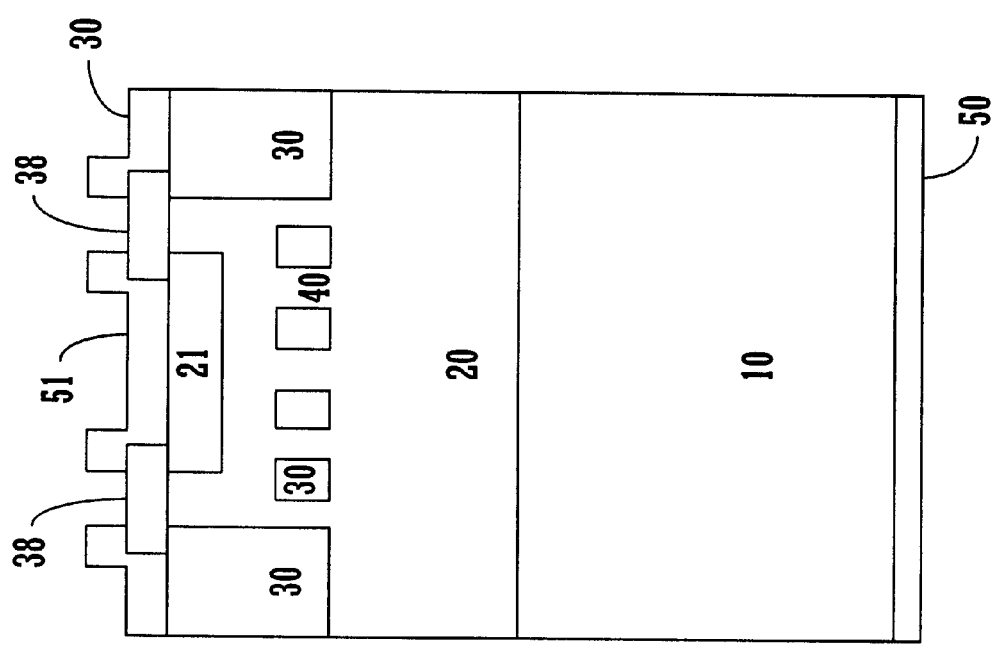
FIG. 4 illustrates the cross-sectional structure of the enhanced mode or normally "off" N-channel or P-channel FET.

FIG. 4 is a cross-sectional structure of enhanced mode or normally "off" FETs that can be built as discrete devices. These FETs are built on heavily doped substrate 10 either N type or P type. The epitaxial layer 20 is grown on the top of the substrate 10 with similar polarity. The purpose of the epitaxial layer 20 is to provide the vertical conduction channel between the gate grid 30. The control gate grid 30 is formed either by implant, trench, or double epitaxial process with different polarity than the epitaxial layer 20. Only implant method is illustrated in this Figure. The gate grid 30 is connected together and connected to the gate pad on the top of the surface. The oxide layer 38 is used to separate the gate grid 30 and the upper electrode 51. As the distance W 40 between the gate grid 30 becomes smaller than the sum of the depletion layer from control grid 30, the device is closed at the zero gate bias condition. This is the basic concept of normally "off" JFET. Only forward bias applied to the gate grid 30 allows the conduction path between the source 51 and drain 50 since the depletion width of a P-N junction decreases as the junction in forward biased. The width W 40 and the doping concentration of the epitaxial layer determine the threshold voltage of the device. In general, the threshold voltage of 0.2V to 0.3V is preferred so that the device can be operated up to 200 deg C. For example, when the forward bias of 0.5V is applied to the gate, the gate grid 30 creates enough conduction paths that allows large current flow under very low bias of 0.1V or less between the source 51 and drain 50. This kind of structure provides very low on resistance or the contact resistance of the switcher for high switching efficiency. Since the forward bias between the gate grid 30 and the epitaxial 20 is only 0.5V, the forward current is relatively small in the range of two to five orders magnitude below the current flow between the source 51 and drain 50. Therefore, this kind of device is suitable for low voltage and high current switch.

Figure 5:
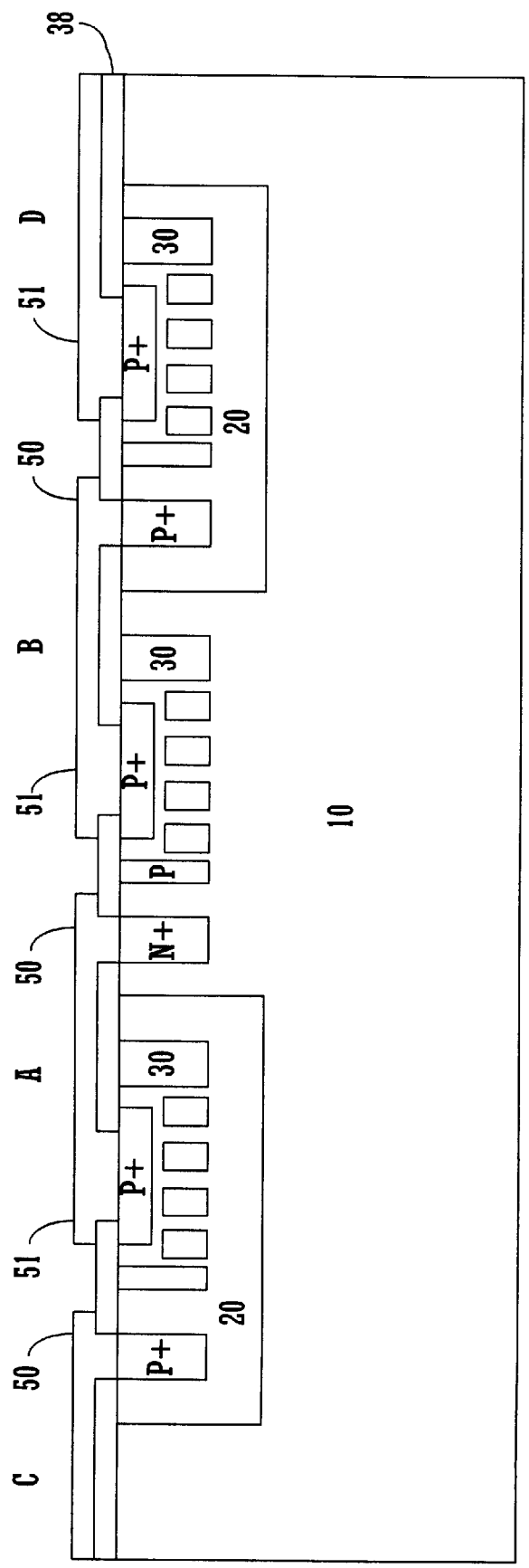
FIG. 5 discloses the cross-sectional structure of this switcher in an integrated unit.

FIG. 5 is a cross-sectiona of this device that can be built in one unit. The substrate 10 is a normal N type or P type material. Use the N type material as an example, the P-well 20 is implanted and diffused into the substrate 10. The gate grid 30 for the N-channel normally "off" JFET is P-type polarity. The gate grid 30 can be made either by implant/diffusion, trench process, or double epitaxial process. For N-channel device, the source and drain are attached to the heavily doped N+ layer 25. Source 51 is connected to layer 25 and it is located on the top of the gate grid 30. Drain 50 is located at the side of the gate grid 30. The P-channel device is formed in similar way with opposite doping polarity. By connecting drain 50 of N-channel JFET 2 to the source 51 of P channel JFET 1 at the left side forms the terminal A. Connecting source 51 of the N channel JFET 2 to the drain 50 of P channel JFET 3 at the right side forms terminal B. Terminal C is the drain 50 of the P channel JFET 1 at left and Terminal D is the source 51 of the P channel JFET 3 at right. Thus this switcher with FOUR-TERMINAL A, B, C, and D plus the control gate is illustrated. The gate grids 30 of these three devices are connected together to the top of the surface at the side of the chip. When a small AC signal (for example, +/−0.5V) is applied to the gate, the integrated device switches the terminals A, B, C, and D according to the function described in FIGS. 1, 2, and 3. In more detail description, when the gate voltage is in positive polarity and larger than the threshold voltage Vt of N-channel JFET, this device is turned-on. The opened width of the conduction channels depending on the forward bias between the gate grid and source and drain. Thus this N-channel device is turned-on and current flows between the source and the drain. When the gate voltage swings to lower than threshold voltage, the N-channel device is closed, the current stops flow between the source and the drain. In this situation, all three JFETs are at "off" state. As the gate voltage swings to negative polarity and similar action turns-on the other two JFETs.

Figure 6:
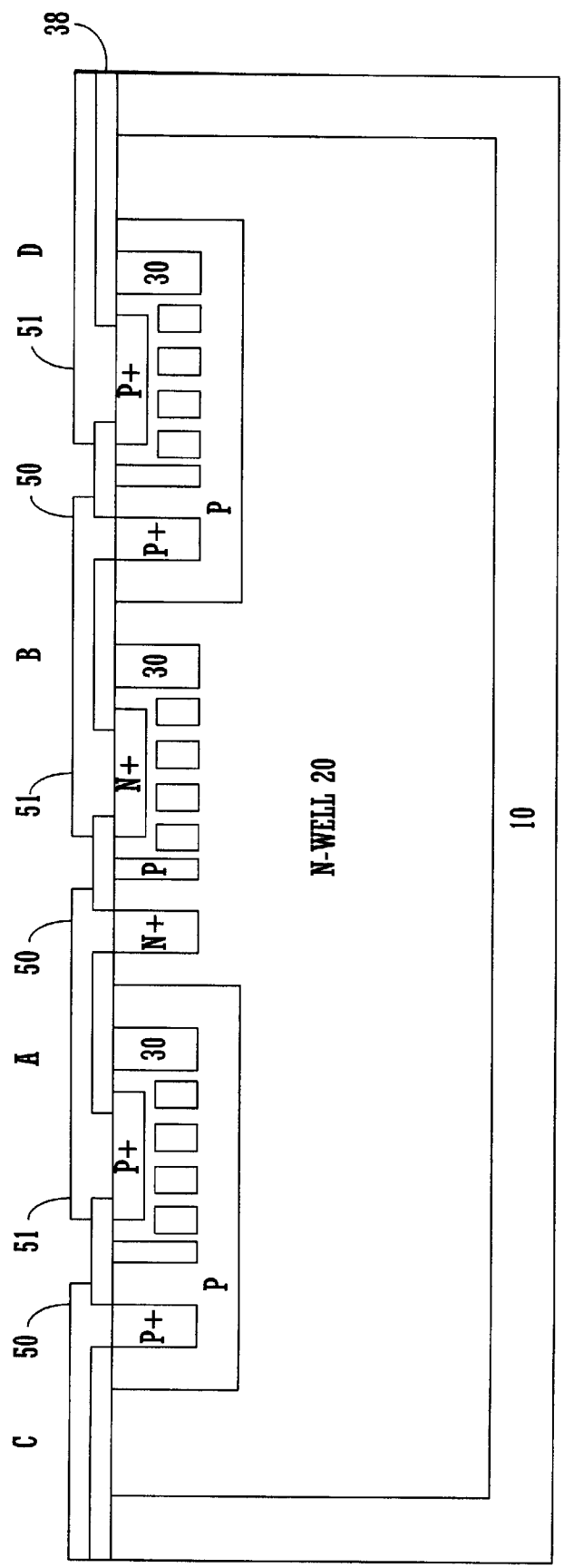
FIG. 6 shows the cross-sectional structure of this switcher in N-Well CMOS process.

FIG. 6 is a cross-sectional structure of this switcher that can be processed along with standard CMOS IC. For example, N-well 20 is using a standard process in CMOS ICs. N-well 20 is built on the substrate 10 of P type material. The isolation between N-well 20 and the substrate 10 is done by reverse bias between the substrate and the N-well 20. The rest of the switcher structure is exactly same as the structure described and illustrated in FIG. 5. Similar structure with different polarity can also be built, such as P-well associated with N type substrate. A current limit device such as a JFET without gate can be built in the same chip for the over-current protection to the gate.

What is claimed is:

1. A switching apparatus for use in a DC to DC power converter, comprising:
   a first normally off junction field effect transistor;
   a second normally off junction field effect transistor coupled in series with the first normally off junction field effect transistor;
   a third normally off junction field effect transistor coupled in series with the second normally off junction field effect transistor;
   a plurality of terminals coupled to the first normally off junction field effect transistor, the second normally off junction field effect transistor, and the third normally off junction field effect transistor;
   three gates associated with the first normally off junction field effect transistor, the second normally off junction field effect transistor, and the third normally off junction field effect transistor, wherein a signal applied to the three gates controls a switching frequency of the switching apparatus.

2. The switching apparatus of claim 1, wherein the first normally off junction field effect transistor is comprised of an N-channel normally off junction field effect transistor, the second normally off junction field effect transistor is comprised of a P-channel normally off junction field effect transistor, and the third normally off junction field effect transistor is comprised of a P-channel normally off junction field effect transistor.

3. The switching apparatus of claim 1, wherein the first normally off junction field effect transistor is comprised of an P-channel normally off junction field effect transistor, the second normally off junction field effect transistor is comprised of an N-channel normally off junction field effect transistor, and the third normally off junction field effect transistor is comprised of an N-channel normally off junction field effect transistor.

4. The switching apparatus of claim 1, further comprising an array of capacitors coupled to the first normally off junction field effect transistor, the second normally off junction field effect transistor, and the third normally off junction field effect transistor, wherein the array of capacitors are charged and discharged according to a signal applied to the gates of the first normally off junction field effect transistor, the second normally off junction field effect transistor, and the third normally off junction field effect transistor.

5. The switching apparatus of claim 4, wherein array of capacitors are coupled in a series configuration for charging and coupled in a parallel configuration for discharging to perform a step-down conversion.

6. The switching apparatus of claim 4, wherein the array of capacitors are coupled in a series configuration for discharging and coupled in a parallel configuration for charging to perform a step-up conversion.

7. The switching apparatus of claim 1, wherein the first normally off junction field effect transistor, the second normally off junction field effect transistor, and the third normally off junction field effect transistor are three discrete devices.

8. The switching apparatus of claim 1, wherein the first normally off junction field effect transistor, the second normally off junction field effect transistor, and the third normally off junction field effect transistor are in an integrated structure.

9. The switching apparatus of claim 1, wherein the first normally off junction field effect transistor, the second normally off junction field effect transistor, and the third normally off junction field effect transistor have different conduction channel polarity.

10. The switching apparatus of claim 1, wherein the first normally off junction field effect transistor, the second normally off junction field effect transistor, and the third normally off junction field effect transistor have a threshold voltages in the range of 0.1 volts to 0.35 volts.

11. The switching apparatus of claim 1, wherein the first normally off junction field effect transistor, the second normally off junction field effect transistor, and the third normally off junction field effect transistor have a forward bias applied which is less than 0.7 volts for a silicon P-N junction.

12. The switching apparatus of claims 1, wherein a bias voltage between electrodes is equal to or less than 0.1 volts.

13. The switching apparatus of claim 1, wherein the first normally off junction field effect transistor, the second normally off junction field effect transistor, and the third normally off junction field effect transistor have an on resistance of less than 1 milliohm.

14. The switching apparatus of claim 1, further comprising a current limit device which is fabricated onto a same substrate as that of the first normally off junction field effect transistor, the second normally off junction field effect transistor, and the third normally off junction field effect transistor.

15. The switching apparatus of claim 14, wherein the current limit device comprises a gateless junction field effect transistor.

16. The switching apparatus of claim 1, wherein the first normally off junction field effect transistor, the second normally off junction field effect transistor, and the third normally off junction field effect transistor are fabricated in an N-well CMOS process.

17. The switching apparatus of claim 1, wherein the first normally off junction field effect transistor, the second normally off junction field effect transistor, and the third normally off junction field effect transistor are majority carrier devices.

18. A switching apparatus, comprising:
a first enhanced mode junction field effect transistor;
a second enhanced mode junction field effect transistor coupled to the first enhanced mode junction field effect transistor;
a third enhanced mode junction field effect transistor coupled in series with the second enhanced mode junction field effect transistor;
a plurality of terminals coupled to the first enhanced mode junction field effect transistor, the second enhanced mode junction field effect transistor, and the third enhanced mode junction field effect transistor;
three gates associated with the first enhanced mode junction field effect transistor, the second enhanced mode junction field effect transistor, and the third enhanced mode junction field effect transistor, wherein a signal applied to the three gates controls a switching frequency of the switching apparatus.

19. The switching apparatus of claim 18, wherein the first enhanced mode junction field effect transistor, the second enhanced mode junction field effect transistor, and the third enhanced mode junction field effect transistor include two different conduction channels.

20. A step-down DC-to-DC power converter comprising:
a first capacitor;
a second capacitor coupled to the first capacitor;
a third capacitor coupled to the second capacitor;
a first four-terminal switching device having one terminal coupled to an input voltage, and another terminal coupled to the first capacitor;
a second four-terminal switching device having one terminal coupled to the first capacitor, another terminal coupled to the second capacitor, and another terminal coupled to one of the terminals of the first four-terminal switching device;
a third four-terminal switching device having one terminal coupled to the second capacitor, another terminal coupled to one of the terminals of the second four-terminal switching device, another terminal coupled to the third capacitor, and another terminal coupled to one of the terminals of each of the first and second four-terminal switching devices, wherein an output voltage is taken across one of the terminals of the third four-terminal switching device and the third capacitor.

21. The step-down DC-to-DC power converter of claim 20, wherein the first four-terminal switching device, the second four-terminal switching device, and the third four-terminal switching device comprise normally off junction field effect transistors.

22. The step-down DC-to-DC power converter of claim 20, wherein the first four-terminal switching device, the second four-terminal switching device, and the third four-terminal switching device comprise enhancement mode junction field effect transistors with N-channel and P-channel structures.

23. A stepup DC-to-DC power converter comprising:
a first capacitor;

a second capacitor coupled to the first capacitor;

a third capacitor coupled to the second capacitor;

a first four-terminal switching device having one terminal coupled to an output voltage, and another terminal coupled to the first capacitor;

a second four-terminal switching device having one terminal coupled to the first capacitor, another terminal coupled to the second capacitor, and two terminals coupled to two terminals of the first four-terminal switching device;

a third four-terminal switching device having one terminal coupled to the second capacitor, another terminal coupled to the third capacitor, and two terminals coupled to two terminals of each of the first and second four-terminal switching devices, wherein an input voltage is applied to one of the terminals of the third four-terminal switching device and the third capacitor.

24. The step-down DC-to-DC power converter of claim 23, wherein the first four-terminal switching device, the second four-terminal switching device, and the third four-terminal switching device comprise normally off junction field effect transistors.

25. The step-down DC-to-DC power converter of claim 23, wherein the first four-terminal switching device, the second four-terminal switching device, and the third four-terminal switching device comprise enhancement mode junction field effect transistors with N-channel and P-channel structures.

* * * * *